United States Patent [19]
Machida

[11] Patent Number: 5,313,290
[45] Date of Patent: May 17, 1994

[54] HUE COMPENSATION APPARATUS FOR A COLOR HARD COPY MACHINE

[75] Inventor: Toshio Machida, Gunma, Japan

[73] Assignee: Kabushiki Kaisha Toshiba, Kawasaki, Japan

[21] Appl. No.: 48,214

[22] Filed: Apr. 19, 1993

Related U.S. Application Data

[63] Continuation of Ser. No. 679,183, Apr. 2, 1991, abandoned.

[30] Foreign Application Priority Data

Apr. 2, 1990 [JP] Japan ............................... 2-84913

[51] Int. Cl.⁵ .............................................. H04N 1/46
[52] U.S. Cl. .................................... 358/500; 358/518; 358/520; 358/522
[58] Field of Search ....................... 358/75, 80, 76, 28, 358/500, 518, 520, 522; H04N 1/46

[56] References Cited

U.S. PATENT DOCUMENTS 4,819,193 4/1989 Imao ..................................... 358/80

FOREIGN PATENT DOCUMENTS 0084228 7/1983 European Pat. Off. ....... H04N 1/46
2455307 11/1980 France ........................... H04N 1/46
2208460A 3/1989 United Kingdom .......... H04N 1/46
2217140A 10/1989 United Kingdom .......... H04N 1/46

Primary Examiner—Edward L. Coles, Sr.
Assistant Examiner—Jerome Grant, II
Attorney, Agent, or Firm—Banner, Birch, McKie and Beckett

[57] ABSTRACT

A hue compensation apparatus outputs hue-compensated data of a color designated by an input color selection signal of red, green and blue, responsive to red, green and blue input signals. The hue compensation apparatus uses first, second and third lookup table circuits, a decoder, a polarizing circuit and a synthesizing circuit. The lookup table circuits output hue-compensated red, green and blue signals in response to input red, green and blue signals, respectively. The decoder decodes the input color selection signal, and the polarization circuit polarizes outputs from the first, second and third lookup table circuits according to an output of the decoder. The synthesizing circuit synthesizes the polarized output from the first, second and third lookup table circuits. The synthesizing circuit thus outputs a hue-compensated color signal whose color is designated by the color selection signal by synthesizing the polarized outputs from the polarization circuit.

10 Claims, 3 Drawing Sheets

HUE COMPENSATION APPARATUS FOR A COLOR HARD COPY MACHINE

This application is a continuation of application Ser. No. 07/679,183, filed Apr. 2, 1991 now abandoned.

BACKGROUND OF THE INVENTION

1. Field of the Invention

The present invention relates to a hue compensation apparatus and, in particular, to a hue compensation apparatus for a color hard copy machine.

2. Description of the Related Art

Often, it is desirable to keep a copy of a CRT (cathode ray tube) display in the form of a photograph or a hard copy. For example, the CRT display may illustrate characteristic curve data in an experiment, figures in CAD (computer aided design) equipment, or TV displays. Color hard copy machines are developed to respond to the needs mentioned above. Many types of color hard copy machines exist; a sublimation-type color hard copy machine is described below.

In the sublimation-type color hard copy machine, first, color signals R (red), G (green) and B (blue), which are derived from picture signals of pictures displayed on the CRT, are transformed to color signals Y (yellow), M (magenta) and C (cyan). Then, heat according to the signals Y, M and C is supplied to thermal print paper by printing heads for every color signal Y, M and C. A color hard copy of the picture displayed on the CRT is obtained by the above procedure.

To properly reproduce the color of the picture displayed on the CRT, compensation as described below is required. That is, the difference between the characteristics of signals R, G, B and signals Y, M, C, or the non-linearity of color depth development to the thermal energy supplied to the thermal print paper, or the non-linearity of color development characteristics in the thermal print paper, or the coming out of a part of a color developed first when next color development is implemented in groups after first color development, need to be compensated. Thus, hue compensation to signals R, G, B need to be implemented to obtain an accurate color hard copy in relation to the original picture.

FIG. 1 is a block diagram of one example of a hue compensation apparatus according to the prior art. Input terminals 10, 12 and 14 receive picture data R, G and B, respectively, to be printed. An input terminal 16 receives a color selection signal which is described later. A lookup table circuit 18 is connected to input terminals 10, 12, 14, 16. One of signals Y, M and C, for example, Y, which is hue-compensated according to input signals R, G and B from input terminals 10, 12 and 14, is output from lookup table circuit 18. The color of output signals from lookup table circuit 18 is designated by the color selection signal from input terminal 16. An output terminal 20 is connected to lookup table circuit 18 and outputs one of signals Y, M and C hue-compensated which is designated by the color selection signal from input terminal 16 as mentioned above.

If signals input to input terminals 10, 12 and 14 are 8 bit signals, the capacity of memory in lookup table circuit 18 must be 16M bites ($=2^8 \times 2^8 \times 2^8$) per color. To print three colors, lookup table 18 needs 48M bites ($=16M$ bites$\times 3$) of memory capacity. The signal for color selection input to input terminal 16 needs only 2 bits.

In the embodiment of FIG. 1, the data must be stored in lookup table circuit 18 which outputs signals Y, M and C responsive to a pair of input signals R, G and B. Moreover, storing the data (which has $2^{24}$ possible combinations) in lookup table circuit 18 is also cumbersome.

FIG. 2 is a block diagram of another example of a hue compensation apparatus according to the prior art. In FIG. 2, input terminals 22, 24 and 26 receive color signals R, G, B, respectively. An operation circuit 28 is connected to input terminals 22, 24 and 26. Operation circuit 28 performs a matrix operation as follows:

$$\begin{vmatrix} R_{HC} \\ G_{HC} \\ B_{HC} \end{vmatrix} = \begin{vmatrix} a & b & c \\ d & e & f \\ g & h & i \end{vmatrix} \begin{vmatrix} R \\ G \\ B \end{vmatrix} \quad (1)$$

Output terminals 30, 32 and 34 are connected to operation circuit 28, and receive the output signals $R_{HC}$, $G_{HC}$, $B_{HC}$ which are hue-compensated, respectively, from operation circuit 28.

In the apparatus, hue-compensated signals $R_{HC}$, $G_{HC}$, $B_{HC}$ are obtained from output terminal 30, 32 and 34, respectively, according to the input signals R, G, B from input terminals 22, 24 and 26.

The apparatus contains simple hardware and is low in cost. However, coefficients multiplied to input signals R, G, B are constant. Thus, the hue compensation method as described may not compensate for non-linear color development characteristics of the thermal print paper. Accordingly, there is a drawback that the hard copy picture may be different from the picture displayed on the CRT.

SUMMARY OF THE INVENTION

Accordingly, it is an object of the present invention to provide an improved hue compensation apparatus for a color hard copy machine which is low cost and also offers highly accurate hue compensation.

In accordance with the present invention, the foregoing object is achieved by providing a hue compensation apparatus which outputs hue-compensated data of a color designated by an input color selection signal of one of red, green and blue according to red, green and blue input signals. The hue compensation apparatus of the present invention uses first, second and third lookup table circuits which output hue compensated red, green and blue signals in response to input red, green and blue signals, respectively. The hue compensation apparatus also employs a decoder which decodes the input color selection signal, polarization circuits which polarize outputs from the first, second and third lookup table circuits, respectively, and a synthesizer which synthesizes the polarized outputs from the polarization circuits. By employing polarization and synthesizing as described above, the present invention offers an advantage over the prior art by providing hue compensation for non-linear characteristics while maintaining a simple, low cost configuration.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENT

The preferred embodiment of the present invention will now be described in more detail with reference to the accompanying drawings.

Figure 1:
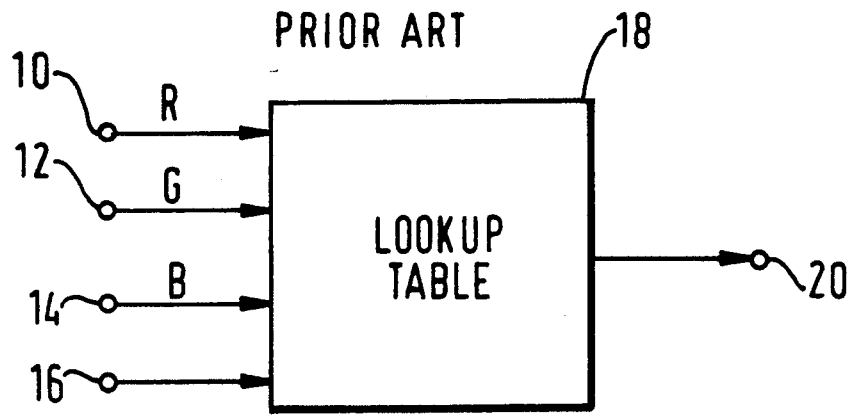
FIGS. 1 and 2 provide block diagrams, respectively, of hue compensation apparatuses according to the prior art.
Figure 2:
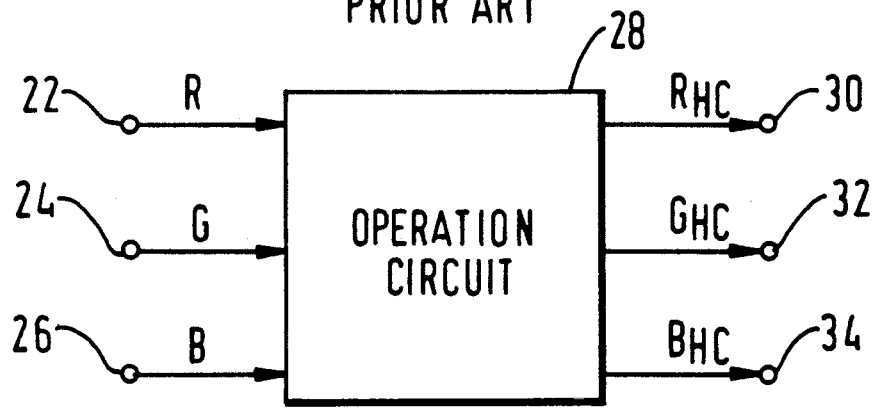
Figure 3:
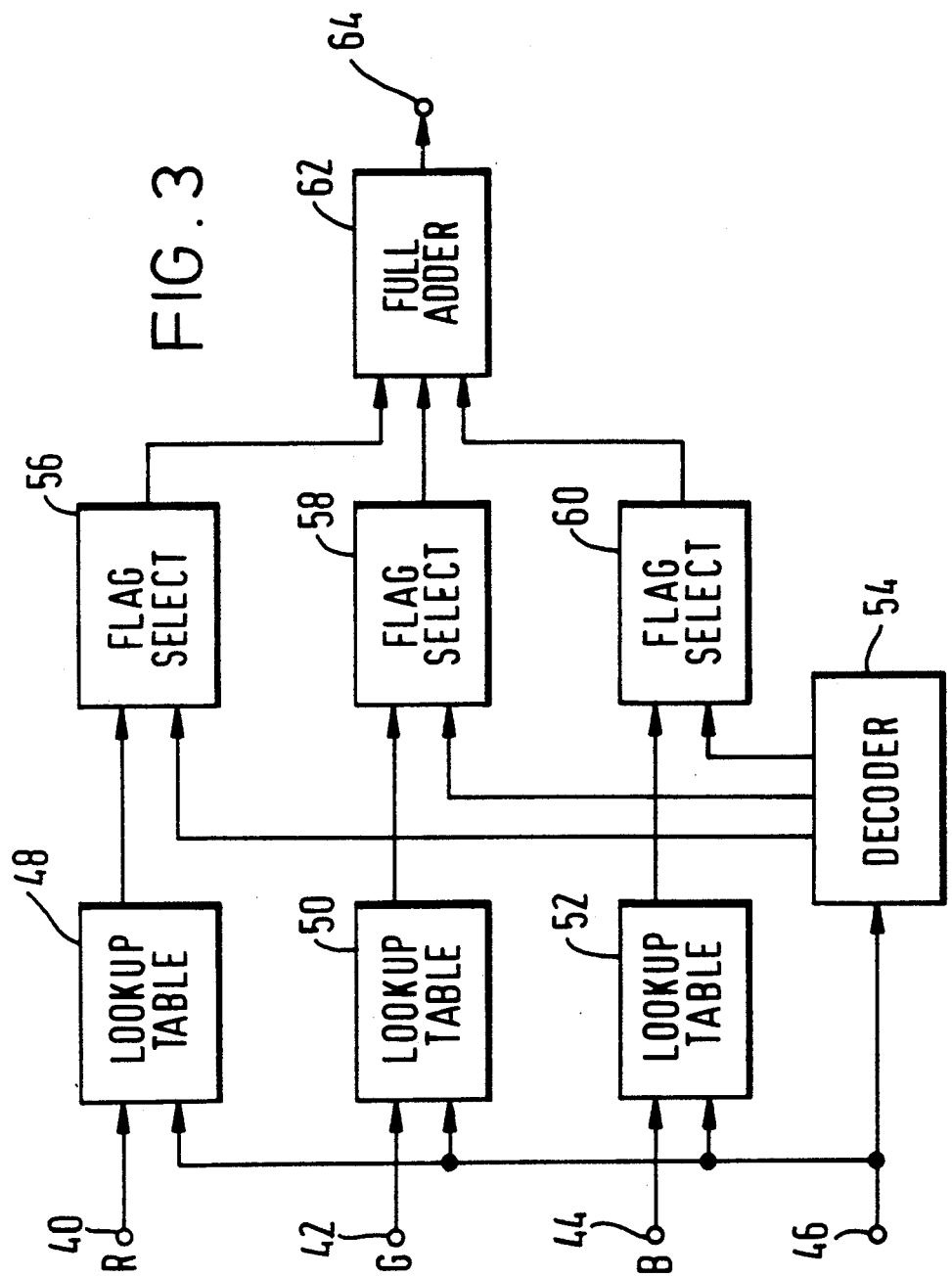
FIG. 3 provides a block diagram of a hue compensation apparatus according to the present invention.

FIG. 3 is a block diagram of a hue compensation apparatus for a color hard copy machine in accordance with the present invention. Input terminals 40, 42 and 44 receive color signals R (red), G (green) and B (blue), respectively. These signals R, G, B are derived from the separation (by a separator which is not shown) of the signal whose picture is displayed on a CRT (not shown). An input terminal 46 receives a color selection signal. The color selection signals designates the color to be hue-compensated. Thus, the color selected by the color selection signal designates changes from R to G, and from G to B.

A lookup table circuit 48 is connected to input terminals 40 and 46. Lookup table circuit 48 non-linearly compensates the hue of the R signal from input terminal 40. A lookup table circuit 50 is connected to input terminals 42 and 46. Similar to lookup table 48, lookup table circuit 50 non-linearly compensates the hue of the G signal from input terminal 42. A lookup table circuit 52 is connected to input terminals 44 and 46. Again, lookup table circuit 52 non-linearly compensates the hue of the B signal from input terminal 44. Lookup table circuits 48, 50 and 52 multiply input signals R, G and B by matrixes, such as the coefficient part of the equation (1). respectively. For example, an output signal $R_{HC}$ is obtained by implementation of an operation of $(a \cdot R)+(b \cdot G)+(c \cdot B)$. The values of the matrixes are varied according to the brightness of the input color signals R, G and B, and also according to the color designated by the color selection signal. Non-linear hue compensation is obtained by changing the coefficients of the matrices according to the amplitude of the input color signals and the color selection signal.

Actually, output values obtained by multiplying the above-mentioned matrixes by the input color signals are stored in advance corresponding to the input signals in lookup table circuits 48, 50 and 52, respectively. Thus, to input color signals R, G and B, hue-compensated signals $R_{HC}$, $G_{HC}$, $B_{HC}$ are output according to the brightness of input color signals R, G and B, and the color selection signal.

In the embodiment, data output from the lookup table circuit which outputs a hue-compensated signal of the color designated by the color selection signal is 8 bit data. Data outputs from the other two lookup table circuits are also 8 bit data. However, only the lower first to seventh bits are actually used as data, and the upper eighth bit is used as a polarization bit component since compound color compensation components are smaller than print data. (The 8 bit data are 2's compliment data.)

A decoder 54 is connected to input terminal 46. Decoder 54 outputs control signals for controlling flag selection circuits 56, 58 and 60 (detailed later) according to the color selection signal from input terminal 46.

Flag selection circuit 56 is connected to lookup table circuit 48 and decoder 54. Flag selection circuit 56 adds the polarity of addition or subtraction, which is used in a full adder circuit 62 (detailed later), to the output $R_{HC}$ from lookup table circuit 48. That is, if the polarity of addition (subtraction) in flag selection circuit 56 is added to the output signal $R_{HC}$ from lookup table circuit 48, the output signal from flag selection circuit 56 is added to (subtracted from) another signal in full adder circuit 62.

Flag selection circuit 58 is connected to lookup table circuit 50 and decoder 54. Similarly, flag selection circuit 58 adds a polarity of addition or subtraction to the output signal $G_{HC}$ from lookup table circuit 50. Also, flag selection circuit 60 adds a polarity of addition or subtraction to the output signal $B_{HC}$ from lookup table circuit 52. Thus, flag selection circuits 56, 58, and 60 polarize the output of lookup tables 48, 50, and 52, respectively.

Full adder circuit 62 is connected to flag selection circuits 56, 58 and 60. Full adder circuit 62 synthesizes, by addition or subtraction, output signals R, G and B from flag selection circuits 56, 58 and 60 according to each polarity added in flag selection circuits 56, 58 and 60, respectively. An output terminal 64 is connected to full adder circuit 58 and outputs final hue-compensated signals R, G and B.

Figure 4:
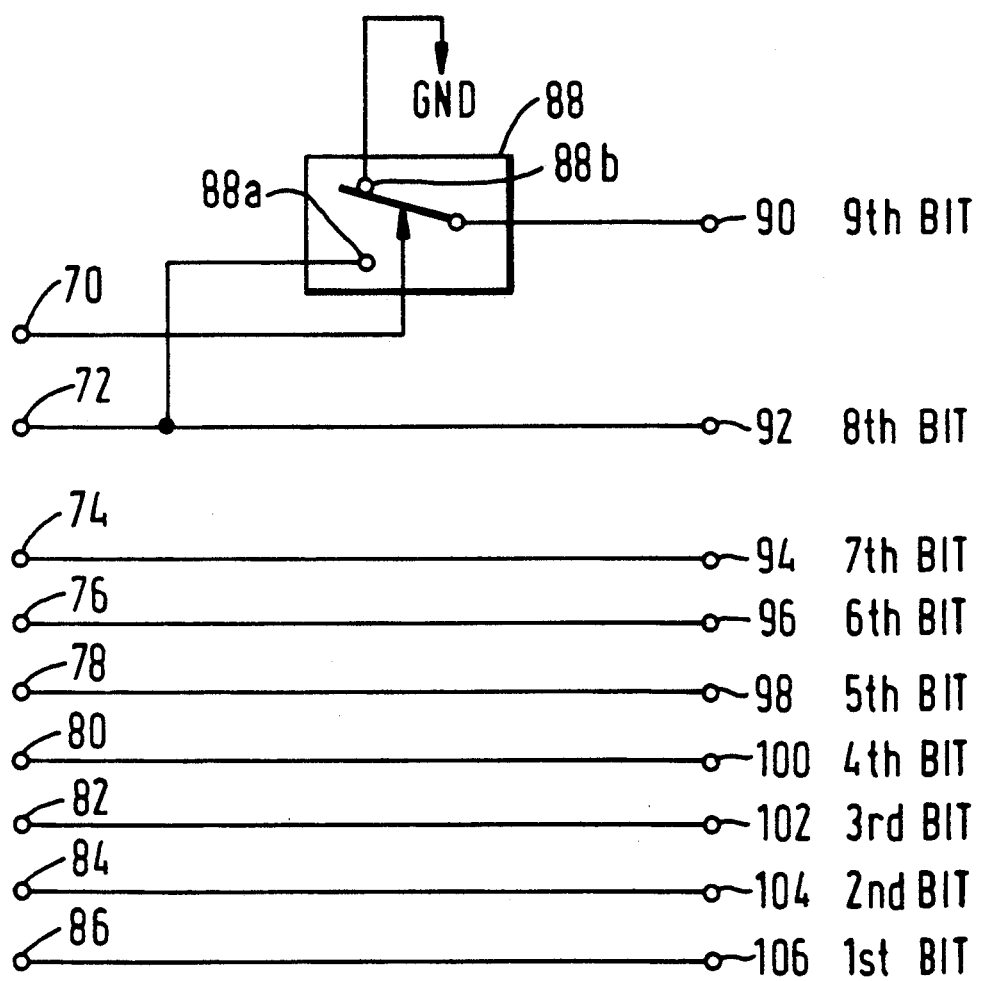
FIG. 4 provides a block diagram of one example of the flag selection circuit shown in FIG. 3.

Flag selection circuit 56 (58, 60) is described more precisely below. FIG. 4 is a block diagram of one example of the flag selection circuit 56 (58, 60) shown in FIG. 3. An input terminal 70 is connected to decoder 54. Input terminals 72 through 86 are connected to lookup table circuit 48 (50, 52). Input terminals 72 through 86 correspond to the eighth bit through the first bit of the output signal from lookup table circuit 48 (50, 52).

A switch circuit 88 is connected to input terminal 72 and ground at its input terminal 88a and 88b, respectively. Switch circuit 88 is controlled by the input signal from input terminal 70. Switch circuit 88 is a switch to set the ninth bit of the output from flag selecting circuit 56 (58, 60) to '0', or to the same value as the value of eighth bit of input signal (via input terminal 72) from lookup table circuit 48 (50, 52), according to the input signal from input terminal 70. That is, in the flag selection circuit connected to the lookup table circuit outputting the hue-compensated signal of the color designated by the color selection signal, switch circuit 88 is connected to terminal 88b. The ninth bit of the output from the flag selection circuit is '0', and the eighth bit through the first bit of the output from the flag selection circuit are the same as from the lookup table circuit. In this case, '0' means the flag (polarity) of addition.

Meanwhile, in the flag selection circuits connected to the other two lookup table circuits, switch circuit 88 is connected to the terminal 88a. The ninth bits of the outputs from the flag selection circuits are obtained from the values of the eight bits, respectively. As mentioned above, in the other two lookup table circuits, the eighth bit is a polarity bit. That is, the ninth bit is used as a flag giving polarity which designates addition or subtraction.

The operation of the embodiment shown in FIGS. 3 and 4 is described below. First, the case in which the color selection signal from the input terminal 46 is designating red (which means that hue-compensated red data is output from full adder circuit. 62) is described.

Color signals R, G and B from input terminals 40, 42 and 44 are input to lookup table circuits 48, 50 and 52, respectively. Then, hue-compensated (where each non-linear element is compensated) signals $R_{HC}$, $G_{HC}$, $B_{HC}$, according to the brightness of the input signals R, G and B and the color selection signal, are output and supplied to flag selection circuits 56, 58 and 60, respectively.

In this case, data output from lookup table circuit 48 is 8 bit data such as '11111111' (=255). Data output from lookup table circuits 50 and 52 are also 8 bit data such as '11110110' (=−9), '00000011' (=3), respectively. In this case, as mentioned above, compound color compensation components (G and B in this case) are smaller than print data (R in this case). Thus, the first through seventh bits are used as data and the eighth bit is used as a polarity bit.

To input signals $R_{HC}$, $G_{HC}$, and $B_{HC}$ supplied to flag selection circuits 56, 58 and 60, respectively, polarities are added. That is, in flag selection circuit 56, switch 88 is connected to terminal 88b (see FIG. 4) by the output from decoder 54. The ninth bit of the output from flag selecting circuit 56 is '0', the eighth through the first bits from flag selection circuit 56 are the same as the output from lookup table circuit 48. The output from flag selection circuit 56 is '011111111'.

Meanwhile, in flag selection circuits 58 and 60, switch circuit 88 is connected to terminal 88 a by the output from decoder 54. The ninth bits of the outputs from flag selection circuits 58 and 60 are the same as the eighth bits of the outputs from lookup table circuits 50 and 52, respectively. That is, the ninth bits are used as flags giving polarity, thereby designating (which designates) addition or subtraction. The outputs from flag selection circuits 58 and 60 are '111110110' and '000000011', respectively.

The output signal from flag selection circuits 56, 58 and 60 are added or subtracted in full adder circuit 62 according to the polarities of the output signals from flag selection circuits 56, 58 and 60. Actually, the output signals from flag selection circuits 56, 58 and 60 are only added because the outputs from flag selection circuits 56, 58 and 60 are compliments of 2. From output terminal 64, non-linearly hue-compensated signal R ('011111001' (=249=255-9+3)) is output.

The color selection signal input from input terminal 46 is then changed to a signal designating green (G). Then, similar hue-compensation as when the signal designated red (R) is implemented. However, in this case, switch 88 is connected to terminal 88b in flag selection circuit 58. In flag selection circuits 56 and 60, switch 88 is connected to terminal 88a. From full adder circuit 62, data for green used as print data is output which is hue-compensated. Naturally, in lookup table circuits 48, 50 and 52, different tables are used than when the color selection signal is red, as mentioned above.

The color selection signal input from input terminal 46 is then changed to a signal designating blue (B) after outputting signal G hue-compensated from full adder circuit 62. Similar hue compensation as with signal R or G is implemented to signal B. However, in flag selection circuit 60, switch 88 is connected to terminal 88b. In flag selection circuit 56 and 58, switch 88 is connected to terminal 88a. Data for blue used as print data is output which is hue-compensated from full adder circuit 62. Naturally, a different table from the one used when the color selection signal is red or green is used in lookup table circuits 48, 50 and 52.

Additionally, output signals R, G and B from output terminal 64 are transformed to signals C, Y and M, respectively, to be used as print data as mentioned above. That is, a circuit (not shown) calculates (1−R) (=C), (1−G) (=M), (1−B) (=Y) to get signals C, Y and M. These signals C, Y and M are used as actual print data.

In the above embodiment, lookup table circuits 48, 50 and 52 correspond to only one color, respectively. Thus, lookup table circuits 48, 50 and 52 only require a memory capacity of $(256 \times 3)$ $(=2^8 \times 3))$ bites, respectively. Further, data to be stored is simple to determine. Accordingly, the hue compensation apparatus of the present invention is low in cost. Moreover, using lookup table circuits 48, 50 and 52 also offers hue compensation for non-linear characteristics such as color development characteristics in thermal print paper. Thus, the accuracy of color reproduction in a color hard copy may be improved, while still employing a low cost matrix operation system.

Modifications and variations of the present invention are possible in light of the above teachings. It is therefore to be understood that, within the scope of the appended claims, the present invention can be practiced in a manner other than as specifically described herein.

What is claimed is:

1. A hue compensation apparatus, which outputs hue-compensated data of a color designated by an input color selection signal of red, green and blue, responsive to red, green and blue input signals, comprising:

first lookup table means for outputting only a single hue-compensated red output signal in response to an input red signal;

second lookup table means for outputting only a single hue-compensated green output signal in response to an input green signal;

third lookup table means for outputting only a single hue-compensated blue output signal in response to an input blue signal;

decoder means for decoding an input color selection signal, and for outputting output signals responsive to said decoded input color selection signal;

polarizing means for polarizing said hue-compensated output signals from said first, second, and third lookup table means according to said output of said decoder means, said polarizing means comprising a plurality of polarity circuits connected respectively to said first, second, and third lookup table means, and said plurality of polarity circuits each having an input which is an output signal from said decoder means; and synthesizing means for synthesizing said polarized output signals from said first, second and third lookup table means.

2. A hue compensation apparatus as claimed in claim 1, wherein said first, second and third lookup tables means each have three possible outputs responsive respectively to said color selection signal being red, green and blue.

3. A hue compensation apparatus as claimed in claim 1, wherein said polarizing means designates that said synthesizing means perform one of addition and subtraction of said output signals from said first, second and third lookup table means, and wherein said output signals from said first, second and third lookup table means are passed through said polarizing means to said synthesizing means.

4. A hue compensation apparatus as claimed in claim 2, wherein each of said output signals from said first, second, and third lookup table means is n bits.

5. A hue compensation apparatus as claimed in claim 4, wherein all output bits from said lookup table means outputting said hue-compensated signal of said color designated by said color selection signal are data bits, and each most significant bit of said output signals from said remaining lookup table means are polarity bits.

6. A method of hue-compensating for outputting hue-compensated data of a color designated by an input color signal of one of red, green and blue, responsive to red, green and blue input signals, comprising the steps of:
outputting only a single hue-compensated red signal in response to an input red signal via a first lookup table means;
outputting only a single hue-compensated green signal in response to an input green signal via a second lookup table means;
outputting only a single hue-compensated blue signal in response to an input blue signal via a third lookup table means;
decoding an input color selection signal and outputting a decoder signal responsive thereto;
polarizing outputs from said hue-compensated red, green and blue signals according to said decoder signals; and
synthesizing said polarized outputs,
wherein said hue-compensated red, green and blue signals are inputs to a plurality of polarizing circuits in said polarizing step and said decoder signals are input as a second input to each of said plurality of polarizing circuits in said polarizing step.

7. A method of hue-compensating for outputting hue-compensated data as claimed in claim 6, wherein the step of polarizing includes designating one of addition and subtraction for each of said hue-compensated red, green and blue signals for execution in said synthesizing step.

8. A hue compensation apparatus, comprising:
a first look-up table having a first input terminal receiving a red color signal, a second input terminal receiving a color selection signal, and an output terminal for outputting a hue-compensated red signal;
a second look-up table having a first input terminal receiving a green color signal, a second input terminal receiving said color selection signal, and an output terminal for outputting a hue-compensated green signal;
a third look-up table having a first input terminal receiving a blue color signal, a second input terminal receiving said color selection signal, and an output terminal for outputting a hue-compensated blue signal;
a first polarity circuit for polarizing the hue-compensated red signal and having a first input terminal connected to said output terminal of said first look-up table to receive the hue-compensated red signal, a second input terminal, and an output terminal;
a second polarity circuit for polarizing the hue-compensated green signal and having a first input terminal connected to said output terminal of said second look-up table to receive the hue-compensated green signal, a second input terminal, and an output terminal;
a third polarity circuit for polarizing the hue-compensated blue signal and having a first input terminal connected to said output terminal of said third look-up table to receive the hue-compensated blue signal, a second input terminal, and an output terminal;
a decoder circuit having an input terminal receiving the color selection signal and first, second and third output terminals respectively connected to the second input terminals of said first, second and third polarity circuits, said decoder circuit outputting control signals at said first, second, and third output terminals for controlling said polarity circuits to polarize the hue-compensated signals in accordance with the color selection signal; and
an adding circuit having input terminals respectively connected to the output terminals of said polarity circuits for adding the output signals of said polarity circuits to provide non-linearly hue-compensated signals.

9. A hue compensation apparatus, which outputs hue-compensated data of a color designated by an input color selection signal of red, green and blue, responsive to red, green and blue input signals, comprising:
first lookup table means for outputting only a single hue-compensated red output signal in response to an input red signal;
second lookup table means for outputting only a single hue-compensated green output signal in response to an input green signal;
third lookup table means for outputting only a single hue-compensated blue output signal in response to an input blue signal;
decoder means for decoding an input color selection signal, and for outputting an output signal responsive to said decoded input color selection signal;
polarizing means for polarizing said hue-compensated output signals from said first, second, and third lookup table means according to said output of said decoder means; and
synthesizing means for synthesizing said polarized output signals from said first, second and third lookup table means,
wherein said input color selection signal is a separate signal from said red, green and blue input signals; said polarizing means designates that said synthesizing means perform one of addition and subtraction of said output signals from said first, second and third lookup table means; said output signals from said first, second and third lookup table means are passed through said polarizing means to said synthesizing means; each of said output signals from said first, second and third lookup table means is n bits,
and wherein said polarizing means comprises a switch for designating a polarity of addition as an $(n+1)$th bit from said n bit output signal from one of said lookup table means, and for outputting as an $(n+1)$th bit a value of an nth bit from said n bit output signals from said remaining lookup table means, respectively.

10. A method of hue-compensating for outputting hue-compensated data of a color designated by an input color signal of one of red, green and blue, responsive to red, green and blue input signals, comprising the steps of:

outputting only a single hue-compensated red signal in response to an input red signal via a first lookup table means;

outputting only a single hue-compensated green signal in response to an input green signal via a second lookup table means;

outputting only a single hue-compensated blue signal in response to an input blue signal via a third lookup table means;

decoding an input color selection signal and outputting a decoder signal responsive thereto;

polarizing outputs from said hue-compensated red, green and blue signals according to said decoder signal; and synthesizing said polarized outputs, wherein said input color selection signal is a separate signal from said input color signal, and wherein the step of polarizing includes outputting a polarity of addition as an upper additional bit to said hue-compensated output of said color designated by said color selection signal, and outputting values identical to most significant bits from remaining hue-compensated signals as upper additional bits to those signals, respectively.

* * * * *